(12) United States Patent
Ito et al.

(10) Patent No.: US 10,128,507 B2
(45) Date of Patent: Nov. 13, 2018

(54) LITHIUM SECONDARY BATTERY

(71) Applicant: Samsung Electronics Co., Ltd., Suwon-si, Gyeonggi-do (KR)

(72) Inventors: Seitaro Ito, Kanagawa (JP); Satoshi Fujiki, Kanagawa (JP); Takanobu Yamada, Kanagawa (JP); Yuichi Aihara, Kanagawa (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 312 days.

(21) Appl. No.: 14/098,622

(22) Filed: Dec. 6, 2013

(65) Prior Publication Data

US 2014/0093786 A1    Apr. 3, 2014

(30) Foreign Application Priority Data

Dec. 7, 2012  (JP) ................................ 2012-268477
Aug. 22, 2013  (KR) ........................ 10-2013-0099926

(51) Int. Cl.
| | |
|---|---|
| *H01M 4/62* | (2006.01) |
| *H01M 4/36* | (2006.01) |
| *H01M 10/0562* | (2010.01) |
| *H01M 4/131* | (2010.01) |
| *H01M 10/052* | (2010.01) |
| *H01M 4/1391* | (2010.01) |

(52) U.S. Cl.
CPC ............. *H01M 4/62* (2013.01); *H01M 4/131* (2013.01); *H01M 4/366* (2013.01); *H01M 10/052* (2013.01); *H01M 10/0562* (2013.01); *H01M 4/1391* (2013.01)

(58) Field of Classification Search
CPC ...... H01M 4/62; H01M 4/131; H01M 10/052; H01M 10/0562; H01M 4/362; H01M 4/364

See application file for complete search history.

(56) References Cited

U.S. PATENT DOCUMENTS

| | | | |
|---|---|---|---|
| 9,166,253 B2 | 10/2015 | Fujiki et al. | |
| 2011/0195315 A1* | 8/2011 | Tsuchida ................ | H01M 4/13 |
| | | | 429/319 |
| 2014/0162139 A1 | 6/2014 | Hoshiba et al. | |

(Continued)

FOREIGN PATENT DOCUMENTS

| | | | |
|---|---|---|---|
| CN | 104557101 A | * | 4/2015 |
| JP | 2004192846 A | * | 7/2004 |

(Continued)

OTHER PUBLICATIONS

Machine translation of JP 2004-192846 A to Takeuchi et al. originally published Jul. 2004.*

(Continued)

*Primary Examiner* — Milton I Cano
*Assistant Examiner* — Jennifer A Moss
(74) *Attorney, Agent, or Firm* — Cantor Colburn LLP (57) ABSTRACT

A lithium secondary battery including: a positive electrode, a negative electrode, and a sulfide solid electrolyte disposed between the positive electrode and the negative electrode, wherein the positive electrode includes a positive active material particle and a coating film including an oxide including lithium (Li) and zirconium (Zr) on a surface of the positive active material particle.

6 Claims, 5 Drawing Sheets

(56) References Cited

U.S. PATENT DOCUMENTS

2014/0162140 A1 6/2014 Hoshiba et al.
2014/0162141 A1 6/2014 Fujiki et al.

FOREIGN PATENT DOCUMENTS

| JP | 2006-196433 A | 7/2006 |
| JP | 2008-004459 A | 1/2008 |
| JP | 2011-065982 A | 3/2011 |
| JP | 2012-178267 A | 9/2012 |
| JP | 2013-089321 A | 5/2013 |
| JP | 2014-116098 A | 6/2014 |
| JP | 2014-116133 A | 6/2014 |
| JP | 2014-116154 A | 6/2014 |
| JP | 2014-116164 A | 6/2014 |

OTHER PUBLICATIONS

Wenjun et al., Machine translation of CN 104557101 A obtained from Espacenet.com Originally published Apr. 2015.*

* cited by examiner

LITHIUM SECONDARY BATTERY

RELATED APPLICATIONS

This application claims priority to and the benefit of Japanese Patent Application No. 10-2012-0268477, filed on Dec. 7, 2012 in the Japanese Patent Office, and Korean Patent Application No. 10-2013-0099926, filed on Aug. 22, 2012, in the Korean Intellectual Property Office, and all the benefits accruing therefrom under 35 U.S.C. § 119, the contents of which are incorporated herein in their entirety by reference.

BACKGROUND

1. Field

The present disclosure relates to a lithium secondary battery, and method of making the same.

2. Description of the Related Art

The development of electronics technology has lead to a decrease in size and weight of portable electronic devices. Also, the need for high-performance and high reliability batteries for such electronic devices has increased. As a battery technology suitable for such electronic devices, a solid-type lithium secondary battery using a solid electrolyte instead of an electrolytic solution is desirable to avoid liquid leakage, to improve stability, and provide improved reliability. Also, since the solid-type lithium secondary battery uses lithium, charging and discharging may occur at a high voltage and at a high energy density, which is why the solid-type lithium secondary battery is attractive from various aspects. Thus there remains a need for an improved solid battery technology.

SUMMARY

Provided is a lithium secondary battery with improved cycling characteristics, capacity, and rate characteristics.

Additional aspects will be set forth in part in the description which follows and, in part, will be apparent from the description.

According to an aspect, a lithium secondary battery includes a positive electrode; a negative electrode; and a sulfide solid electrolyte disposed between the positive electrode and the negative electrode, wherein the positive electrode includes a positive active material particle and a coating film including an oxide including lithium (Li) and zirconium (Zr) on a surface of the positive active material particle.

An average secondary particle diameter D50 of the positive active material particle with the coating film thereon may be 5 micrometers (μm) or less.

The oxide containing lithium (Li) and zirconium (Zr) may be a compound represented by Formula 1, and the sulfide solid electrolyte may include at least one of $Li_2S$ and $P_2S_5$, and an amount of the oxide containing lithium (Li) and zirconium (Zr) represented by Formula 1 may be in a range of about 0.1 to about 2.0 mole percent (mol %), based on a total amount of the positive active material particle and the oxide containing lithium (Li) and zirconium (Zr) represented by Formula 1.

$$aLi_2O\text{---}ZrO_2 \qquad \text{Formula 1}$$

wherein $0.1 \leq a \leq 2.0$.

The positive active material particle may be, for example, $Li_{1-x-z}Ni_xCo_yAl_zO_2$ or $Li_{1-x-y-z}Ni_xCo_yMn_zO_2$, wherein $0<x<1$, $0<y<1$, $0<z<1$, and $x+y+z<1$.

The positive active material particle may have a layered rock-salt type structure.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A solid-type lithium secondary battery includes a positive electrode, a solid electrolyte, and a negative electrode. An example of the solid electrolyte is a sulfide-based solid electrolyte.

While not wanting to be bound by theory, it is understood that when the sulfide-based solid electrolyte is used, during charging, a reaction may occur at an interface between a positive active material and the solid electrolyte to generate resistive components. Thus, a resistance (hereinafter referred to as "interfacial resistance") against lithium ions moving along and/or across the interface between the positive active material and the solid electrolyte increases. Due to the increase in the interfacial resistance, a conductivity of lithium ions may decrease and thus, the power output of the lithium secondary battery may decrease. Accordingly, there is a high need to develop a method of reducing an interfacial resistance between the positive active material and the solid electrolyte.

Hereinafter, a lithium secondary battery according to an embodiment will be disclosed in further detail.

Figure 1:
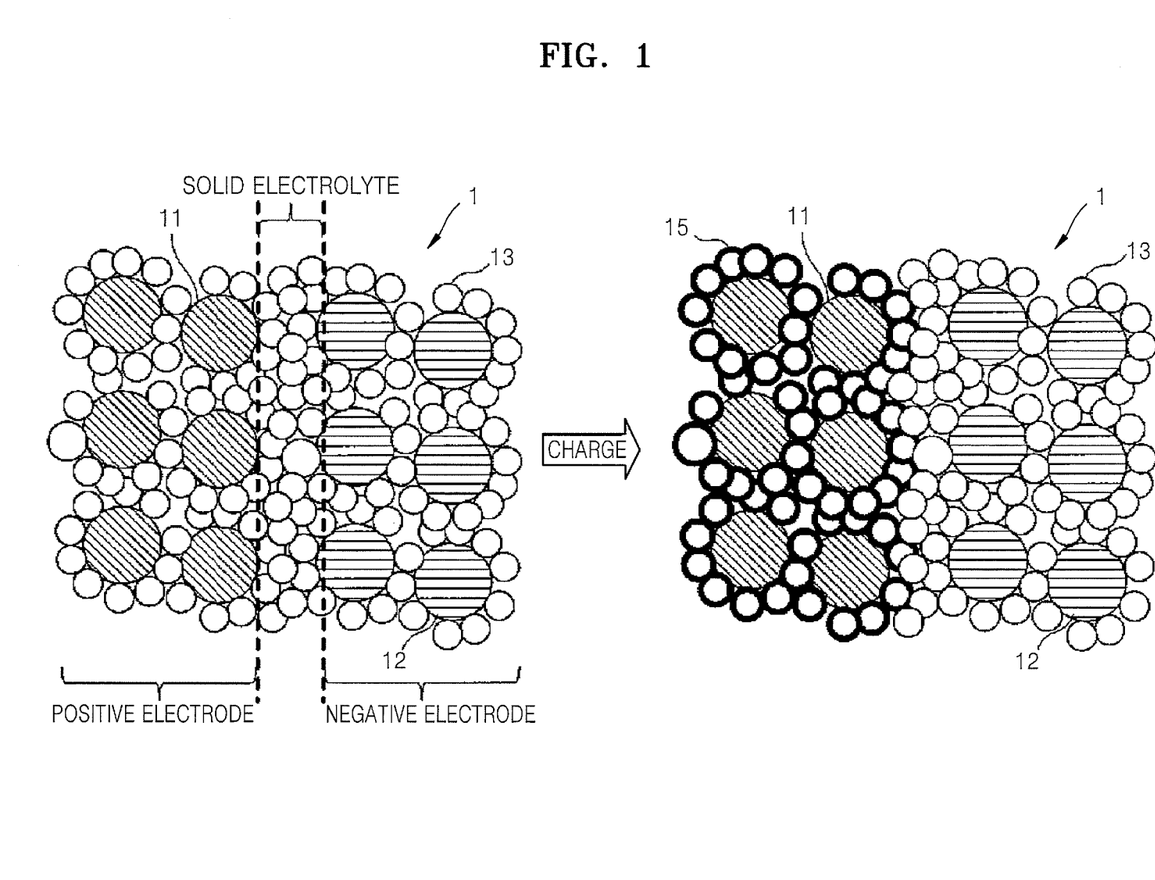
FIG. 1 is a schematic diagram of a process to explain an increase in an interfacial resistance of an all-solid secondary battery.

FIG. 1 is a schematic diagram to explain an increase in interfacial resistance in an embodiment of an all-solid secondary battery 1, which is a lithium secondary battery. Referring to FIG. 1 and while not wanting to be bound by theory, in the all-solid secondary battery, since the positive electrode active material and the electrolyte are each a solid, the electrolyte may not penetrate into the positive active material. Also, an interfacial area between the positive active material and the electrolyte is reduced, and thus, it is difficult to provide sufficient movement paths of lithium ions and electrons. Accordingly, as illustrated in FIG. 1, an interfacial area between an active material and a solid electrolyte may be widened by using a positive electrode assembled structure, in which a positive active material particle 11 and a solid electrolyte particle 13 are combined, to provide a material for forming a positive electrode, and a negative electrode assembled structure, in which a negative active material particle 12 and the solid electrolyte particle 13 are combined, to provide a material for forming a negative electrode.

However, when a sulfide-based solid electrolyte is used as the solid electrolyte particle 13 of the all-solid secondary battery 1, during charging, a reaction may occur between the positive active material particle 11 and the solid electrolyte particle 13 to produce a resistive component at an interface between the positive active material and the solid electrolyte. When a high-resistance layer 15 is formed on the surface of the positive active material particle 11, an interfacial resistance of the positive active material particle 11 and the solid electrolyte particle 13 may increase. Herein, the high-resistance layer 15 is formed on the surface of the positive active material particle 11 to act as a resistive component, and due to the high-resistance layer 15, a resistance against lithium ions moving into the positive active material particle 11 or toward the solid electrolyte particle 13 may be undesirably high. As such, when an interfacial area of the positive active material particle 11 and the solid electrolyte particle 13 increases, although lithium ions and electrons secure their movement paths, the high-resistance layer 15 is highly likely to be formed. Accordingly, the movement of lithium ions from the positive active material 11 to the solid electrolyte particle 13 is interrupted by the high-resistance layer 15 to decrease lithium ion conductivity and as a result, an output of the all-solid secondary battery 1 may be reduced.

To prevent such problems, a coating film formed of an oxide containing lithium (Li) and zirconium (Zr), e.g., as represented by Formula 1, is formed on the surface of a positive active material. Due to the formation of the coating film, an interfacial reaction between the positive active material and the solid electrolyte may be suppressed, and thus, rate characteristics and cyclic characteristics of a lithium secondary battery may be substantially improved.

$$a\text{Li}_2\text{O}—\text{ZrO}_2 \quad\quad \text{Formula 1}$$

wherein $0.1 \leq a \leq 2.0$.

Figure 2:
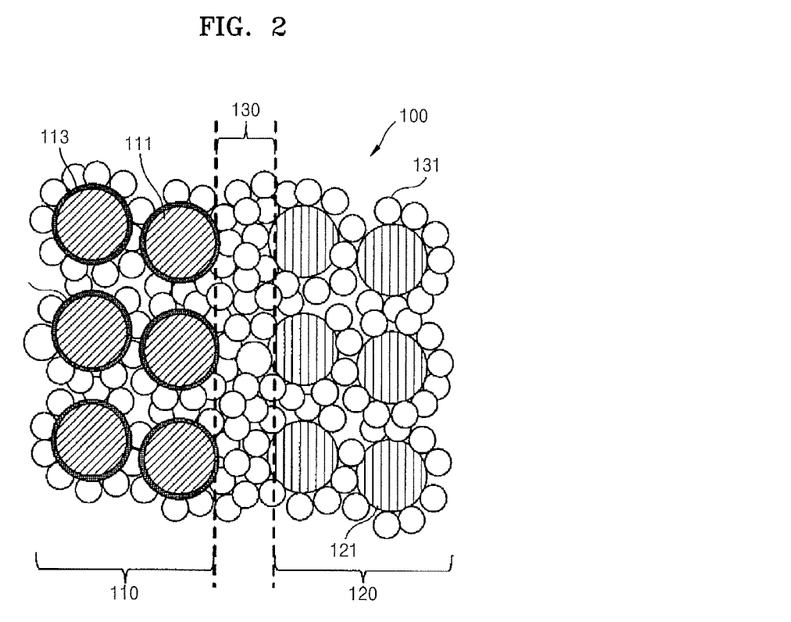
FIG. 2 is a schematic view of an embodiment of a lithium secondary battery.

FIG. 2 is a schematic view to explain an embodiment of a lithium ion secondary battery 100.

Referring to FIG. 2, the lithium ion secondary battery 100 has a layered structure including a positive electrode 110, a negative electrode 120, and a solid electrolyte 130 disposed between the positive electrode 110 and the negative electrode 120.

The positive electrode 110 includes a positive active material 111 in the form of particles, wherein a coating film 113 is on the surface of each particle of the positive active material 111. The coating film 113 may be provided by providing a coating of a compound represented by Formula 1. In an all-solid-type lithium ion secondary battery using a sulfide-based solid electrolyte, an interfacial resistance is understood to increase due to an interfacial reaction between a positive active material and a solid electrolyte, and thus, the output of a battery is low. However, in the lithium ion secondary battery 100, the surface of the positive active material 111 is coated with the coating film 113 including the compound represented by Formula 1 so that the coating film 113 prevents a direct contact between a solid electrolyte particle 131 of the solid electrolyte 130 and the positive active material 111, thereby suppressing formation of a resistive component at an interface between the positive active material 111 and the solid electrolyte particle 131. Also, when the surface of the positive active material 111 is coated with the compound of Formula 1, an increase in resistance at an interface between the positive active material 111 and the solid electrolyte particle 131 may be suppressed. By doing so, the lithium ion secondary battery 100 according to an embodiment has improved rate characteristics and cycling characteristics.

The compound of Formula 1 is chemically stable, and when coated on the surface of the positive active material 111, a direct contact between the positive active material 111 and the solid electrolyte particle 131 may be prevented to suppress an interfacial reaction between the positive active material 111 and the solid electrolyte particle 131.

The coating film 113 may be coated on an entire surface of the positive active material 111, or may be coated on a portion of the surface of the positive active material 111.

While not wanting to be bound by theory, it is understood that the coating film 113 has lithium ion conductivity, and when in contact with the positive active material 111 or the solid electrolyte particle 131, the coating film 113 may retain its layered shape without movement.

Also, the formation of the coating film 113 including the compound of Formula 1 on the surface of the particle of the positive active material 111 may be, for example, verified by using a microscopic image (an image of scanning electron microscopy ("SEM") or a transmission electron microscopy ("TEM")) analysis method performed based on a difference in contrast due to different structures of the positive active material 111 and the coating film 113.

Hereinafter, the positive active material 111 included in the positive electrode 110 and the coating film 113 will be disclosed in further detail.

A lithium ion secondary battery according to an embodiment includes: a positive electrode including a positive active material particle; a negative electrode; and a sulfide-based solid electrolyte disposed between the positive electrode and the negative electrode, wherein the positive active material particle has a coating film containing an oxide containing lithium (Li) and zirconium (Zr) on a surface thereof.

The oxide containing lithium (Li) and zirconium (Zr) may be the compound of Formula 1, and the sulfide-based solid electrolyte includes at least one of $\text{Li}_2\text{S}$ and $\text{P}_2\text{S}_5$, and an amount of the oxide containing lithium (Li) and zirconium (Zr) represented by Formula 1 may be in a range of about 0.1 to about 2.0 mole percent (mol %), based on the total amount of the positive active material particle and the oxide containing lithium (Li) and zirconium (Zr) represented by Formula 1.

$$a\text{Li}_2\text{O}—\text{ZrO}_2 \quad\quad \text{Formula 1}$$

wherein $0.1 \leq a \leq 2.0$.

The positive active material has a layered rock-salt type structure, and may comprise, for example, $\text{Li}_{1-x-y-z}\text{Ni}_x\text{Co}_y\text{Al}_z\text{O}_2$ or $\text{Li}_{1-x-y-z}\text{Ni}_x\text{Co}_y\text{Mn}_z\text{O}_2$, wherein $0<x<1$, $0<y<1$, $0<z<1$, and $x+y+z<1$.

According to another embodiment, an average secondary particle diameter D50 of the positive active material particle with the coating film thereon may be 5 micrometers (μm) or less.

The compound of Formula 1 may be a composite oxide of $\text{Li}_2\text{O}$ and $\text{ZrO}_2$.

In the manufacturing process of a positive electrode for a lithium secondary battery, when an average particle diameter of a positive active material particle is 5 μm or less, a specific surface area of the positive active material increases and effects of a lithium resistance layer may be minimized and thus, an interfacial resistance decreases.

However, the use of such a small particle diameter of the positive active material particle leads to an increase in the interfacial area, and thus, in addition to charging and discharging reactions of a lithium secondary battery, formation of an interfacial resistance layer is promoted, and ultimately, the interfacial resistance substantially increases due to the cycling of charging and discharging and characteristics of a battery may deteriorate.

However, regarding a lithium secondary battery according to an embodiment, when a coating film including the compound of Formula 1 is formed on the surface of a positive active material, an interfacial reaction between the positive active material and the solid electrolyte may be substantially suppressed, and the formation of a interfacial resistance layer may be efficiently suppressed, and accordingly, advantages raised by the use of a small particle diameter of the positive active material particle may be sufficiently utilized. As a result, a decrease in an interfacial resistance of the lithium secondary battery during charging and discharging occurs, and thus, a discharge capacity of the lithium secondary battery increases, and rate characteristics and cyclic characteristics of the lithium secondary battery may substantially improve.

When a in Formula 1 is within the foregoing range, a lithium secondary battery including a positive electrode using a positive active material may have improved cyclic characteristics and impedance characteristics, and an initial discharge capacity increases and conductivity of lithium ions is excellent.

According to an embodiment, a in Formula 1 may be 1.

The compound of Formula 1 may be obtained as follows: $Li_2O$ and $ZrO_2$ may be dissolved at a temperature that is much higher than their melting points, e.g., greater than 2715° C., to be molten-mixed at a selected ratio, and then, maintained for a selected period of time at that temperature, and then rapidly cooled.

According to an embodiment, an average particle diameter of the positive active material and the coating film including the oxide containing lithium (Li) and zirconium (Zr) may be 5 μm or less, and in particular, in a range of about 0.1 to about 5 μm.

A D10 average particle diameter of the positive active material may be in a range of about 2.0 to about 3.5 μm, for example, about 2.5 to about 3.0 μm. A D50 particle diameter of the positive active material may be in a range of about 3.0 to about 5.0 μm, for example, about 3.3 μm to about 4.5 μm, and a D90 particle diameter of the positive active material may be in a range of about 3.5 to about 5.0, for example, about 4.5 μm to about 5.0 μm.

The terms "D50", "D10", and "D90" respectively indicate particle diameters corresponding to 50 volume percent (vol %), 10 vol %, and 90 vol % in the cumulative distribution curve of the positive active material.

According to an embodiment, the sulfide-based solid electrolyte includes lithium sulfide ($Li_2S$) and phosphorus pentasulfide ($P_2S_5$).

The positive electrode may be obtained as follows: a positive active material coated with a coating film containing the compound of Formula 1 is combined with various additives, water, and an organic solvent to prepare a suspension- or paste-state mixture, the obtained mixture is coated on a current collector by using a doctor blade, and the result is dried and compressed by using a pressing roll.

A current collector for the positive electrode may be, for example, a plate formed of indium, copper, magnesium, stainless steel, titanium, iron, cobalt, nickel, zinc, aluminum, germanium, lithium, or an alloy thereof. According to another embodiment, without the use of the current collector, the positive active material coated with the compound of Formula 1 may be combined with various additives and the mixture molded into pellets to complete the manufacturing of the positive electrode.

Hereinafter, the method of forming a coating film including the oxide containing lithium (Li) and zirconium (Zr) on a positive active material will be disclosed in further detail.

First, for the preparation of the positive active material, in an embodiment only positive active material particles having an average particle diameter of 5 μm or less are used. To obtain such positive active material fine powder, an automatic sieve machine may be used.

Lithium alkoxide and zirconium alkoxide are combined in a solvent by stirring to prepare an alcohol solution of $aLi_2O$—$ZrO_2$ to provide a coating solution for coating $aLi_2O$—$ZrO_2$ to form the coating film.

The solvent may be an alcohol, such as methanol or ethanol. As a gelation promoter, water is used, and as a gelation suppressor, ethyl acetoacetate may be additionally used.

Lithium alkoxide may be obtained by, for example, reacting organic lithium with an alcohol.

A time for stirring and mixing lithium alkoxide and zirconium alkoxide is not limited, and may be, for example, about 30 minutes. A time for stirring and mixing lithium alkoxide and zirconium alkoxide is not limited, and may be, for example, about 30 minutes. A compound having the structure of $CH_3$—CO—$CH_2$—CO—O—R wherein R is a $C_1$-$C_{10}$ alkyl group, for example, methyl, ethyl, or propyl, such as ethyl acetoacetate, may act as a stabilizer of zirconium alkoxide, since two carbonyl groups of the structure act as a chelating agent to stabilize unstable metal.

Then, the coating solution for coating $aLi_2O$—$ZrO_2$ is mixed with the positive active material fine powder, and the mixed solution was heated while stirring to evaporate the used solvent, such as an alcohol. In this regard, an ultrasonic wave may be radiated to the mixed solution. By doing so, a precursor for $aLi_2O$—$ZrO_2$ may be homogeneously present on the particle surface of the positive active material fine powder.

The drying may be performed at a temperature of about 30 to about 80° C., for example, about 40° C. During the drying, a vacuum pump or a rotary evaporator may be used.

Also, the precursor for $aLi_2O$—$ZrO_2$ present on the particle surface of the positive active material fine powder may be heat treated at a high temperature. In this regard, the heat treatment temperature may be controlled to be in a range of about 350° C. to about 750° C., for example, about 350° C.

Although the heat treatment time is not limited, for example, the heat treatment time may be in a range of about 1 to about 3 hours, for example, 2 hours.

The heat treatment may be performed in an oxygen gas atmosphere. When oxygen gas is supplied, reducing nickel in a nickel-containing positive electrode is suppressed to maintain a capacity.

By performing the above-mentioned manufacturing process, a positive active material, on which a coating film containing the compound represented by Formula 1 is formed, may be obtained.

In the coating film, an amount of the compound represented by Formula 1 may be in a range of about 0.01 to about 2 mol %, for example, about 0.01 to about 0.95 mol %, based on the total weight of the positive active material particle and $Li_2O$—$ZrO_2$. When the amount of $Li_2O$—$ZrO_2$ is within the foregoing range, improved initial discharge capacity and improved cycling characteristics may be obtained.

The coated positive active material powder and the solid electrolyte are mixed with a conducting agent to prepare a positive electrode composition, which is then coated to complete the manufacturing of the positive electrode.

Examples of the conducting agent are carbon black, graphite, acetylene black, Ketjen black, and carbon fiber.

The positive electrode composition may further include, for example, a binder.

Examples of the binder are polytetrafluoroethylene, polyvinylidene fluoride, styrene-butadiene block copolymer ("SBS"), nitrile rubber ("NBR"), chloroprene rubber ("CR"), and a partial hydride or complete hydride thereof; a copolymer of ester polyacrylate, a vinylidene fluoride-hexafluoropropylene ("VDF-HFP") copolymer, and carboxylic acid modified product thereof; polyethylene chloride ("CM"), ester polymethacrylate, polyvinyl alcohol, an ethylene vinyl alcohol copolymer, polyimide, polyamide, polyamideimide; a styrene-based thermoplastic elastomer, such as a styrene-ethylene-butadiene-styrene block copolymer ("SEBS") or a styrene-ethylene-butadiene-styrene block copolymer; and styrene-butadiene rubber ("SBR"), butadiene rubber ("BR"), natural rubber ("NR"), isoprene rubber ("IR"), ethylene propylene diene terpolymer ("EPDM") and, a partial hydride or complete hydride thereof. Also, polystyrene, polyolefin, olefin-based thermoplastic elastomer, polycycloolefin, and a silicon resin may also be used.

However, the binder is not limited to these materials. The binder may be any suitable non-polar resin that is used as a binder in the art.

The binder may be polytetrafluoroethylene, polyvinylidene fluoride, or polyethylene. In some embodiments, the positive electrode composition may further include any materials that are used in manufacturing a positive electrode for a lithium secondary battery in the art, including a filler, a dispersing agent, and an ion electric conductor.

The negative electrode may be manufactured in the same manner as the positive electrode, except that instead of the positive active material, a negative active material is used.

The negative active material may be any suitable material that is alloyable with lithium or can reversibly intercalate and deintercalate lithium, and examples of such materials are a metal, such as lithium, indium, tin, aluminum, or silicon, or an alloy thereof; a transition metal oxide, such as $Li_4/3Ti_5/3O_4$ or SnO; and a carbonaceous material, such as artificial graphite, graphite carbon fiber, resin calcination carbon, thermal decomposition vapor growth carbon, corks, mesocarbon microbeads ("MCMB"), furfuryl alcohol resin calcination carbon, polyacene, pitch-based carbon fiber, vapor growth carbon fiber, or natural graphite.

A current collector for the negative electrode may be, for example, a plate formed of indium, copper, magnesium, stainless steel, titanium, iron, cobalt, nickel, zinc, aluminum, germanium, lithium, or an alloy thereof. According to another embodiment, the current collector for the negative electrode may not be used and instead, a mixture of the negative active material and various additives may be molded into pellets for use as the negative electrode. When the negative active material is metal or an alloy thereof, a metal thin film may be used as the negative electrode.

When a sulfide-based solid electrolyte is used as the solid electrolyte, the sulfide-based solid electrolyte may be prepared by dissolving and rapid cooling or mechanical milling ("MM").

According to the dissolving and rapid cooling, $Li_2S$ and $P_2S_5$ are mixed at a selected ratio to obtain pellets, and the pellets are reacted at a predetermined reaction temperature in vacuum, and then rapidly cooled to obtain the sulfide-based solid electrolyte. The reaction temperature may be in a range of about 400° C. to about 1000° C., and for example, about 800° C. to about 900° C. The reaction time may be in a range of about 0.1 to about 12 hours, for example, about 1 to about 12 hours. The rapid cooling temperature may be 10° C. or less, for example, 0° C. or less, and the cooling speed may be in a range of about 1 to about 10000 Kelvin per second (K/sec), for example, about 1 to about 1000 K/sec.

According to MM, $Li_2S$ and $P_2S_5$ are mixed at a predetermined ratio, and then, reacted for a predetermined period of time to obtain a sulfide-based solid electrolyte. As such, MM is performed at room temperature. Accordingly, without thermal decomposition of source materials, a solid electrolyte with a desired composition may be obtained.

When MM is performed, a rotation speed and a rotation time of a mechanical milling device are not limited. However, when the rotation speed is high, the solid electrolyte may be quickly produced, and when the rotation time is long, materials for forming the solid electrolyte may be modified.

Thereafter, the result is heat treated at a predetermined temperature, and then, pulverized to obtain a solid electrolyte in the form of particles. The solid electrolyte particle may be subjected to any known film forming method, for example, blasting, aerogel deposition, cold spraying, sputtering, chemical vapor growth ("CVD"), or metalizing to completely prepare a solid electrolyte. According to another embodiment, coating of a solution prepared by mixing a solid electrolyte with a solvent and a binder is performed, and then, the solvent is removed therefrom to form a film form.

According to another embodiment, a solid electrolyte itself may be directly used as a solid electrolyte, or a solid electrolyte is mixed with a binder and a support, and then, the mixture is pressed to prepare a solid electrolyte.

The support used herein may be used to enhance the strength of the solid electrolyte or prevent shorting of the solid electrolyte.

The positive electrode, the solid electrolyte, and the negative electrode are stacked to manufacture a lithium secondary battery. After the stacking, pressing may be further performed thereon.

The solid electrolyte may comprise, for example, a sulfide-based solid electrolyte including lithium sulfide ($Li_2S$) and phosphorus pentasulfide ($P_2S_5$). The solid electrolyte may further include, in addition to lithium sulfide ($Li_2S$) and phosphorus pentasulfide ($P_2S_5$), other sulfides, such as $SiS_2$, $GeS_2$, or $B_2S_3$.

The sulfide-based solid electrolyte including lithium sulfide ($Li_2S$) and phosphorus pentasulfide ($P_2S_5$) may be obtained as follows: a sulfide including lithium sulfide ($Li_2S$) and phosphorus pentasulfide ($P_2S_5$) is heated at a temperature higher than melting points of lithium sulfide ($Li_2S$) and phosphorus pentasulfide ($P_2S_5$) and then, mixed at a predetermined ratio and maintained for a predetermined period of time, and rapidly cooled. In this regard, a mixed molar ratio of lithium sulfide ($Li_2S$) and phosphorus pentasulfide ($P_2S_5$) may be in a range of about 50:50 to about 80:20, for example, about 60:40 to about 75:25.

According to another embodiment, the sulfide including lithium sulfide ($Li_2S$) and phosphorus pentasulfide ($P_2S_5$) may be obtained by mechanically milling a sulfide including lithium sulfide ($Li_2S$) and phosphorus pentasulfide ($P_2S_5$).

Structure of Lithium Secondary Battery

Figure 3:
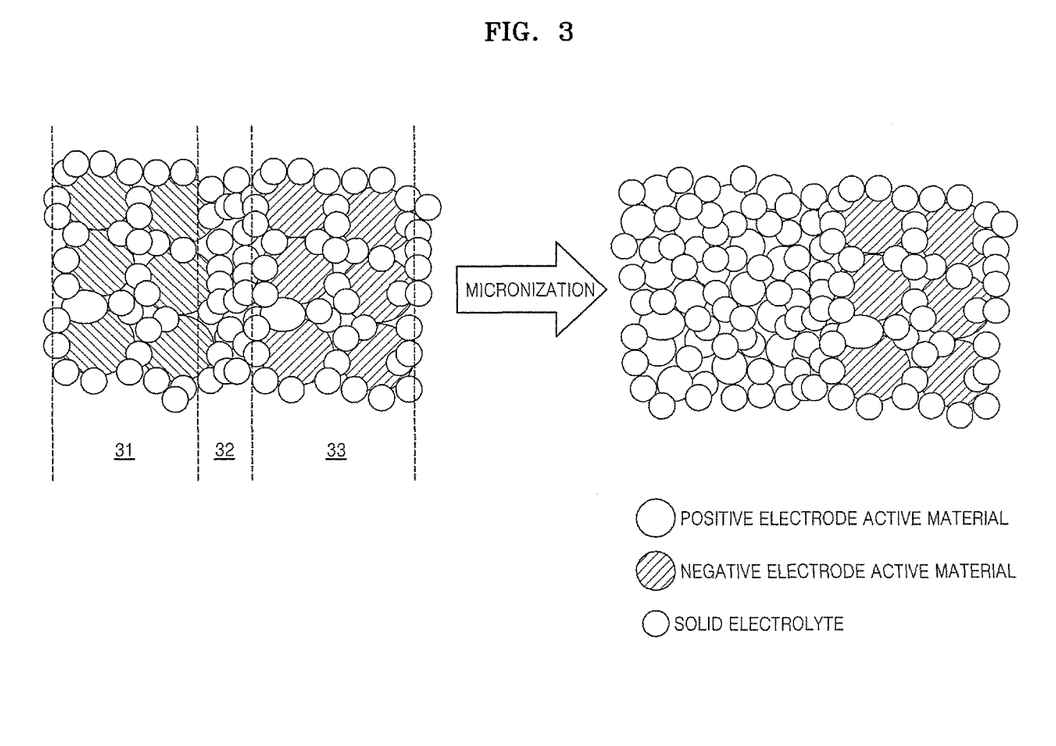
FIG. 3 is a schematic view of an embodiment of a process of micronization in an embodiment of a lithium secondary battery.

A solid-type lithium secondary battery, which is an example of a lithium secondary battery according to an embodiment, will be described in detail with reference to FIG. 3.

The solid-type lithium secondary battery includes a positive electrode 31, a negative electrode 33, and a solid electrolyte 32 disposed between the positive electrode 31 and the negative electrode 33. The positive electrode 31 includes a coated positive active material and the solid electrolyte 32, wherein the positive active material having a relatively small particle diameter contacts the solid electrolyte 32 more to have a larger interfacial area.

Materials for Battery (Material for Positive Active Material)

A positive active material may comprise any suitable lithium-containing metal oxide that is used in the art. For example, at least one composite oxide of lithium and metal, such as cobalt, manganese, nickel, or a combination thereof, may be used, and examples thereof are $Li_aA_{1-b}M_bD_2$ (wherein, $0.90 \leq a \leq 1$, and $0 \leq b \leq 0.5$); $Li_aE_{1-b}M_bO_{2-c}D_c$ (wherein, $0.90 \leq a \leq 1$, $0 \leq b \leq 0.5$, and $0 \leq c \leq 0.05$); $LiE_{2-b}M_bO_{4-c}D_c$ (wherein, $0 \leq b \leq 0.5$, and $0 \leq c \leq 0.05$); $Li_aNi_{1-b-c}Co_bM_cD_\alpha$ (wherein, $0.90 \leq a \leq 1$, $0 \leq b \leq 0.5$, $0 \leq c \leq 0.05$, and $0 < \alpha \leq 2$); $Li_aNi_{1-b-c}Co_bM_cO_{2-\alpha}X_\alpha$ (wherein, $0.90 \leq a \leq 1$, $0 \leq b \leq 0.5$, $0 \leq c \leq 0.05$, and $0 < \alpha < 2$); $Li_aNi_{1-b-c}Co_bM_cO_{2-\alpha}X_2$ (wherein, $0.90 \leq a \leq 1$, $0 \leq b \leq 0.5$, $0 \leq c \leq 0.05$, and $0 < \alpha < 2$); $Li_aNi_{1-b-c}Mn_bM_cD_\alpha$ (wherein, $0.90 \leq a \leq 1$, $0 \leq b \leq 0.5$, $0 \leq c \leq 0.05$, and $0 < \alpha \leq 2$); $Li_aNi_{1-b-c}Mn_bM_cO_{2-\alpha}X_\alpha$ (wherein, $0.90 \leq a \leq 1$, $0 \leq b \leq 0.5$, $0 \leq c \leq 0.05$, and $0 < a < 2$); $Li_aNi_{1-b-c}Mn_bM_cO_{2-a}X_2$ (wherein, $0.90 \leq a \leq 1$, $0 \leq b \leq 0.5$, $0 \leq c \leq 0.05$, and $0 < a < 2$); $Li_aNi_bE_cG_dO_2$ (wherein, $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein, $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein, $0.90 \leq a \leq 1$ and $0.001 \leq b \leq 0.1$); $Li_aCoG_bO_2$ (wherein, $0.90 \leq a \leq 1$ and $0.001 \leq b \leq 0.1$); $Li_aMnG_bO_2$ (wherein, $0.90 \leq a \leq 1$ and $0.001 \leq b \leq 0.1$); $Li_aMn_2G_bO_4$ (wherein, $0.90 \leq a \leq 1$ and $0.001 \leq b \leq 0.1$); $QO_2$; $QS_2$; $LiQS_2$; $V_2O_5$; $LiV_2O_5$; $LiX'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$ In the formulas above, A is Ni, Co, Mn, or a combination thereof; M is Al, Ni, Co, Mn, Cr, Fe, Mg, Sr, V, a rare-earth element, or a combination thereof; D is O, F, S, P, or a combination thereof; E is Co, Mn, or a combination thereof; X is F, S, P, or a combination thereof; G is Al, Cr, Mn, Fe, Mg, La, Ce, Sr, V, or a combination thereof; Q is Ti, Mo, Mn, or a combination thereof; X' is Cr, V, Fe, Sc, Y, or a combination thereof; and J is V, Cr, Mn, Co, Ni, Cu, or a combination thereof.

For example, $LiCoO_2$, $LiMn_xO_{2x}$ (x=1 or 2), $LiNi_{1-x}Mn_xO_{2x}$ ($0 < x < 1$), $LiNi_{1-x-y}Co_xMn_yO_2$ ($0 \leq x \leq 0.5$, $0 \leq y \leq 0.5$), or $FePO_4$ may be used.

These compounds may have a coating on their surfaces, or these compounds may be mixed with a compound having a coating film. The coating may include an oxide of a coating element, a hydroxide of a coating element, an oxyhydroxide of a coating element, an oxycarbonate of a coating element, or a hydroxycarbonate of a coating element. These compounds that form the coating may be amorphous or crystalline. As a coating element included in the coating, Mg, Al, Co, K, Na, Ca, Si, Ti, V, Sn, Ge, Ga, B, As, Zr, or a combination thereof may be used. The coating may be formed by using any suitable coating methods that are performed using the compounds and the elements which do not adversely affect properties of the cathode active material (for example, spray coating, immersion, or the like). The details of the coating methods can be determined by one of skill in the art without undue experimentation.

The positive active material may be, from among such positive active materials, a lithium salt of a transition metal oxide, wherein the lithium salt has a layered rock-salt type structure. In the present specification, the term "layered" refers to a thin sheet shape. The term "rock-salt type structure" refers to a sodium chloride type structure, which is a crystal structure and is constructed by dislocating a half of corners of a unit lattice in a face-centered cubic lattice, wherein a cation and an anion respectively form the cores. The lithium salt of the transition metal oxide, having a layered rock-salt type structure, may be, for example, $Li_{1-x-y-z}Ni_xCo_yAl_zO_2$ ("NCA"), wherein $0 < x < 1$, $0 < y < 1$, $0 < z < 1$, and $x+y+z < 1$, or $Li_{1-x-y-z}Ni_xCo_yMn_zO_2$ ("NCM"), wherein $0 < x < 1$, $0 < y < 1$, $0 < z < 1$, and $x+y+z < 1$. When the compound is used as a positive active material, an all solid-type lithium ion battery with high energy density and durability may be obtained. Also, lithium salt particles (present as an agglomerate of primary particles) of a ternary transition metal oxide, such as NCA or NCM, may have smaller particle diameter and 10 times greater specific surface area than, for example, $LiCoO_2$ ("LCO") particles. Accordingly, a contact area of a positive active material and a solid electrolyte increases, and thus, lithium ion conductivity improves and the output of a battery may increase. Also, the inclusion of Ni of the positive active material as a constituent element may lead to an increase in capacity density of a lithium ion secondary battery, and also, since metal leakage into the electrolyte during charging is low, long-term reliability of a lithium ion secondary battery may improve.

The positive electrode may further include, in addition to a positive active material particle with a coating film thereon, for example, an additive, such as a binder, an electrolyte, filler, a dispersant, or a conducting agent.

The conducting agent may be, for example, graphite, carbon black, acetylene black, Ketjen black, carbon fiber, or metal powder. The binder may be, for example, polytetrafluoroethylene, polyvinylidene fluoride, or polyethylene. The electrolyte may be a sulfide-based solid electrolyte. The filler, the dispersant, the conducting agent may be any one of various materials commercially used in an electrode for a lithium secondary battery.

The coating film formed on the surface of a positive active material includes the compound of Formula 1, and thus, may efficiently suppress an interfacial reaction between the positive active material and the solid electrolyte. Accordingly, due to the formation of the coating film, cycling characteristics and impedance of a lithium ion secondary battery may improve and also initial discharge capacity may improve. The compound of Formula 1 may be a composite oxide of $Li_2O$ and $ZrO_2$ and may have lithium ions having excellent conductivity. Also, a in Formula 1 may satisfy the condition of $0.1 \leq a \leq 2.0$. The compound of Formula 1 may be prepared as follows: $Li_2O$ and $ZrO_2$ are heated to a temperature at which both materials totally dissolve and then combine at a selected ratio, the heating is maintained for a selected time, and then the product rapidly cooled.

A coating amount of the coating film may be in a range of, for example, about 0.1 to about 2.0 mol %, based on the total weight of the positive active material and the compound of Formula 1. When a positive active material including such coating amount range of the coating film is used, a lithium secondary battery having high initial discharge capacity and excellent cycling characteristics may be obtained.

(Materials for Negative Electrode)

The negative active material may be selected from any suitable negative active materials that are used in a lithium secondary battery in the art.

For example, the anode active material may include lithium metal, a lithium-alloyable metal, transition metal oxide, non-transition metal oxide, a carbonaceous material, or a combination thereof.

For example, the lithium-alloyable metal may be Si, Sn, Al, Ge, Pb, Bi, Sb, Si-M" alloy (where M" is an alkali metal, an alkaline earth metal, a Group 13 element, a Group 14 element, a transition metal, a rare earth element, or a combination thereof and M" is not Si), or a Sn-M" alloy (where M" is an alkali metal, an alkaline earth metal, a Group 13 element, a Group 14 element, a transition metal, a rare earth element, or a combination thereof and M" is not Sn). The element M" may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may be titanium oxide, vanadium oxide, or lithium vanadium oxide.

For example, the transition metal oxide may be $SnO_2$, $SiO_x$ ($0 < x < 2$), or the like.

The carbonaceous material may be crystalline carbon, amorphous carbon, or a mixture thereof. The crystalline carbon may be natural or artificial graphite that is amorphous, tabular, flake, circular, or fibrous, and the amorphous carbon may be soft carbon (cold calcined carbon) or hard carbon, meso-phase pitch carbide, or calcined cokes.

The negative active material may be a graphite-based active material, for example, artificial graphite, natural graphite, a mixture of artificial graphite and natural graphite, or artificial graphite-coated natural graphite. Also, the negative active material may be tin (Sn) or silicon (Si).

The negative active material may be, for example, lithium, indium, tin, aluminum, or silicon, and an alloy thereof; a transition metal oxide, such as $Li_4/3Ti_5/3O_4$ or SnO; and a carbonaceous material, such as artificial graphite, natural graphite carbon fiber, resin calcination carbon, thermal decomposition vapor growth carbon, coke, mesocarbon microbeads (MCMB), furfural alcohol, resin calcination carbon, polyacene, pitch-based carbon fiber, vapor growth carbon fiber, or natural graphite. These negative active materials may be used alone or in combination of two or more of these.

The negative active material may further include, for example, an additive, such as a conducting agent, a binder, a filler, or a dispersant. Examples of these additives are the same as described in connection with the positive electrode.

(Materials for Solid Electrolyte)

A solid electrolyte includes a sulfide-based solid electrolyte, for example, lithium sulfide ($Li_2S$), and as a second compound, silicon sulfide ($SiS_2$), phosphorus sulfide, germanium sulfide ($GeS_2$), boron sulfide ($B_2S_3$), or a combination thereof. The solid electrolyte may be, for example, $Li_2S$—$P_2S_5$.

The solid electrolyte may further include $Li_3PO_4$, halogen, or a halogenated compound.

The sulfide-based solid electrolyte may further include, $Li_2S$—$P_2S_5$, which is known to have higher lithium ion conductivity than other inorganic compounds, such as $SiS_2$, $GeS_2$, or $B_2S_3$. Also, the solid electrolyte may include $Li_3PO_4$, halogen, a halogenated compound, LISICON, $Li_{3+y}PO_{4-x}N_x$ ("LIPON"), $Li_{3.25}Ge_{0.25}P_{0.75}S_4$ ("Thio-LISICON"), or $Li_2O$—$Al_2O_3$—$TiO_2$—$P_2O_5$ ("LATP"), in addition to at least one inorganic solid electrolyte selected from $Li_2S$—$P_2S_5$, $SiS_2$, $GeS_2$, and $B_2S_3$.

The solid electrolyte may be $Li_2S$—$P_2S_5$, $Li_2$—$SiS_2$, $Li_{3.25}P_{0.25}Ge_{0.76}S_4$, $Li_{4-x}Ge_{1-x}P_xS_4$ ($0<x<1$), $Li_7P_3S_{11}$, or $Li_2S$—$SiS_2$—$Li_3PO_4$ glass. For example, the solid electrolyte may be $Li_2S$—$P_2S_5$.

The sulfide-based solid electrolyte may be prepared as follows: a sulfide including $Li_2S$ and $P_2S_5$ is heated to a temperature higher than their melting points, and then, dissolved and mixed at a selected rate, and the heating maintained for a selected time, and then, rapidly cooled (dissolution and rapid cooling). According to another embodiment, a sulfide including $Li_2S$ and $P_2S_5$ may be obtained by MM. A molar ratio of the sulfide including $Li_2S$ and $P_2S_5$ may be, for example, about 50:50 to about 80:20, for example, about 60:40 to about 75:25.

A lithium secondary battery may be a lithium ion secondary battery or a solid-type lithium secondary battery.

A plurality of lithium secondary batteries may be stacked to form a battery pack. The battery pack may be used in various devices requiring high capacity and high output. For example, battery assemblies may be used in a notebook computer, a smartphone, an electric vehicle, or the like.

Embodiments are disclosed in further detail with reference to Examples below. However, the following examples are provided for illustrative purpose only.

EXAMPLES

Example 1

First, lithium methoxide was mixed with zirconium (IV) propoxide in a mixed solution of ethanol, ethyl acetoacetate, and water for 30 minutes. Thereafter, $LiNi_{1/3}Mn_{1/3}Co_{1/3}O_2$ (NCM333, Japan Chemical Co. Ltd), as a positive active material was added to the mixed solution such that a coating amount of $aLi_2O$—$ZrO_2$ (a=1) was 0.1 mol % with respect to NCM333, and then, the mixed solution was heated to a temperature of 40° C. to evaporate a solvent therefrom. In this regard, an ultrasonic wave may be radiated to the mixed solution. A precursor for $Li_2O$—$ZrO_2$ present on the surface of NCM333 was heat treated in an oxygen atmosphere at a temperature of 300° C. for 2 hours to obtain a 0.1 mol % $Li_2O$—$ZrO_2$-surface coated NCM333 (hereinafter referred to as "surface coated NCM333").

A phosphorus (In) thin film (thickness: 0.05 mm), as a negative electrode, was disposed in a cell container, and then, 80 mg of a solid electrolyte (SE) prepared by mechanically milling $Li_2S$—$P_2S_5$ (a molar ratio of $Li_2S$ and $P_{255}$ was 80:20) was deposited thereon, and a surface thereof was treated by using a molding device.

The surface thin-filmed NCM333, the SE, and a vapor growth carbon fiber ("VGCF"), as an electrically conducting agent, were mixed at a weight ratio of 60/35/5 to obtain a positive electrode mixture, which was then deposited on the SE, and the resultant structure was pressed at a pressure of about 3 tons per square centimeter ($t/cm^2$) to manufacture pellets, thereby completing manufacturing of a battery. This battery, obtained by using the method described above, was charged with a constant current at a temperature of 25° C. at a rate of 0.02 C up to an upper voltage limit of 4.3 Volts (V), and an initial discharge capacity thereof was measured. Then, the battery was discharged at a rate of 0.1 C until a final discharge voltage decreased down to 2.5 V, and in this way, charging and discharging were repeatedly performed. Regarding the test battery, a capacity retention ratio with respect to initial capacity after 30 cycles was measured and cyclic characteristics were measured based on the obtained results.

Example 2

A test battery was manufactured in the same manner as in Example 1, except that a coating amount of $aLi_2O$—$ZrO_2$ (a=1) was 0.5 mol %, and characteristics of the test battery were evaluated.

Example 3

A test battery was manufactured in the same manner as in Example 1, except that a coating amount of $aLi_2O$—$ZrO_2$ (a=1) was 2 mol %, and characteristics of the test battery were evaluated.

Example 4

A test battery was manufactured in the same manner as in Example 2, except that $Li_{1/3}Ni_{1/3}Co_{1/3}Al_{1/3}O_2$ ("NCA") was used as a positive active material, and characteristics of the test battery were evaluated.

Example 5

A test battery was manufactured in the same manner as in Example 2, except that LiCoO$_2$ ("LCO") was used as a positive active material, and characteristics of the test battery were evaluated.

Example 6

A test battery was manufactured in the same manner as in Example 2, except that a of aLi$_2$O—ZrO$_2$ was 0.1, and characteristics of the test battery were evaluated.

Example 7

A test battery was manufactured in the same manner as in Example 2, except that a of aLi$_2$O—ZrO$_2$ was 2, and characteristics of the test battery were evaluated.

Example 8

For use as a positive active material, LiNi$_{1/3}$Mn$_{1/3}$Co$_{1/3}$O$_2$ ("NCM") particles having a particle diameter of about 5 µm or less (D10: 2.5 µm, D50: 3.3 µm, D90: 4.5 µm) were collected by using an auto sieving machine to prepare positive active material fine powder.

Lithium methoxide, zirconium propoxide, ethanol, and ethyl acetoacetate were stirred and mixed for 30 minutes to prepare an alcohol solution of aLi$_2$O—ZrO$_2$ (a=1) (coating solution for coating aLi$_2$O—ZrO$_2$). In this regard, amounts of lithium methoxide and zirconium propoxide were controlled such that an amount of aLi$_2$O—ZrO$_2$ (a=1) coated on the surface of the positive active material was 0.5 mol %.

Then, the coating solution for coating the aLi$_2$O—ZrO$_2$ was mixed with the positive active material fine powder, and this mixed solution was heated to about 40° C. while stirring to evaporate a solvent, such as an alcohol, therefrom. In this regard, an ultrasonic wave may be radiated to the mixed solution.

By doing so, a precursor for aLi$_2$O—ZrO$_2$ was present on the surface of positive active material fine powder.

Also, the precursor for aLi$_2$O—ZrO$_2$ (a=1) present on the surface of positive active material fine powder was heat treated at a temperature of 350° C. in an oxygen atmosphere for 1 hour. Due to the heat treatment, the precursor for aLi$_2$O—ZrO$_2$ (a=1) present on the surface of positive active material was changed into aLi$_2$O—ZrO$_2$ (a=1).

Thus, an aLi$_2$O—ZrO$_2$-surface coated positive active material was obtained.

Subsequently, the obtained coated positive active material fine powder, lithium sulfide (Li$_2$S)-phosphorus pentasulfide (P$_2$S$_5$), which was a solid electrolyte at a molar ratio of 80:20, and carbon, which was a conducting agent, were mixed in a mortar and the mixed powder was pressed by using a hand press at a pressure of 4.5 ton/cm$^2$ to obtain a positive electrode compressed body 41 in the form of pellets. The positive electrode compressed body 41, a solid electrolyte compressed body 42, and a negative electrode compressed body 43 were deposited to manufacture a solid-type lithium secondary battery 40 of FIG. 4.

Figure 4:
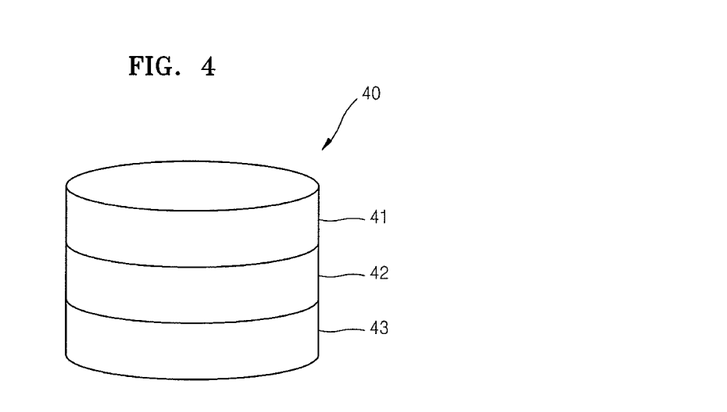
FIG. 4 is a view of another embodiment of a lithium secondary battery.

The solid electrolyte compressed body 42 was obtained by mechanically milling 80-20 mol % Li$_2$S—P$_2$S$_5$. As the negative electrode compressed body 43, an indium thin film (thickness: about 0.05 mm) was used.

Example 9

For use as positive active material, LiNi$_{1/3}$Mn$_{1/3}$Co$_{1/3}$O$_2$ ("NCM") particles having a particle diameter of about 5 µm or less (D10: 2.5 µm, D50: 3.3 µm, D90: 4.5 µm) were collected by using an auto sieving machine to obtain positive active material fine powder.

Subsequently, the positive active material fine powder, lithium sulfide (Li$_2$S)-phosphorus pentasulfide (P$_2$S$_5$), which was a solid electrolyte at a molar ratio of 80:20, and carbon, which was a conducting agent, were mixed in a mortar and the mixed powder was pressed by using a hand press at a pressure of 4.5 ton/cm$^2$ to obtain a positive electrode compressed body 41 in the form of pellets. The positive electrode compressed body 41, a solid electrolyte compressed body 42, and a negative electrode compressed body 43 were deposited to manufacture a solid-type lithium secondary battery 40 of FIG. 4.

The solid electrolyte compressed body 42 was obtained by mechanically milling 80-20 mol % Li$_2$S—P$_2$S$_5$. As the negative electrode compressed body 43, an indium thin film (thickness: about 0.05 mm) was used.

Example 10

For use as positive active material, LiNi$_{1/3}$Mn$_{1/3}$Co$_{1/3}$O$_2$ ("NCM") particles having a particle diameter of about 5 µm or less (D10: 4.6 µm, D50: 6.4 µm, D90: 9.1 µm) were collected by using an auto sieving machine to obtain positive active material fine powder.

Subsequently, the positive active material fine powder, lithium sulfide (Li$_2$S)-phosphorus pentasulfide (P$_2$S$_5$), which was a solid electrolyte at a molar ratio of 80:20, and carbon, which was a conducting agent, were mixed in a mortar and the mixed powder was pressed by using a hand press at a pressure of 4.5 ton/cm$^2$ to obtain a positive electrode compressed body 41 in the form of pellets.

The positive electrode compressed body 41, a solid electrolyte compressed body 22, and a negative electrode compressed body 43 were deposited to manufacture a solid-type lithium secondary battery 40 of FIG. 4.

The solid electrolyte compressed body 42 was obtained by mechanically milling 80-20 mol % Li$_2$S—P$_2$S$_5$. As the negative electrode compressed body 43, an indium thin film (thickness: about 0.05 mm) was used.

Example 11

A lithium secondary battery was manufactured in the same manner as in Example 8, except that as a positive active material, positive active material LiNi$_{1/3}$Mn$_{1/3}$Co$_{1/3}$O$_2$ particles having an average particle diameter D10 of 4.6 µm, an average particle diameter D50 of 6.4 µm, and an average particle diameter D90 of 9.1 µm were used.

Comparative Example 1

A test battery was manufactured in the same manner as in Example 1, except that a thin film was not formed on the surface of the positive active material NCM333, and characteristics of the test battery were evaluated.

Comparative Example 2

A test battery was manufactured in the same manner as in Example 1, except that a coating amount of aLi$_2$O—ZrO$_2$ (a=1) was 0.05 mol %, and characteristics of the test battery were evaluated.

Comparative Example 3

A test battery was manufactured in the same manner as in Example 1, except that a coating amount of aLi$_2$O—ZrO$_2$ (a=1) was 3 mol %, and characteristics of the test battery were evaluated.

Comparative Example 4

A test battery was manufactured in the same manner as in Example 1, except that $Li_2SiO_3$ was not formed on the surface of the positive active material NCM333, and characteristics of the test battery were evaluated.

Comparative Example 5

A test battery was manufactured in the same manner as in Example 1, except that $Li_2Ti_2O_5$ was not formed on the surface of the positive active material NCM333, and characteristics of the test battery were evaluated.

Comparative Example 6

A test battery was manufactured in the same manner as in Example 2, except that a of $aLi_2O$—$ZrO_2$ was 0, that is, $ZrO_2$ was coated on the surface of the positive active material NCM333, and characteristics of the test battery were evaluated.

Comparative Example 7

A test battery was manufactured in the same manner as in Example 2, except that a of $aLi_2O$—$ZrO_2$ was 2.5, and characteristics of the test battery were evaluated.

Evaluation Example 1: Characteristics of Batteries

Examples 1-7 and Comparative Examples 1-7

A positive active material, materials for a coating film, and a coating amount of the lithium secondary batteries manufactured according to Examples 1-7 and Comparative Examples 1-7, and characteristics of the lithium secondary batteries of Examples 1-7 and Comparative Examples 1-7 were evaluated, and results thereof are shown in Table 1 below.

As shown in Table 1, all the test batteries of Examples 1 to 7 each including a positive active material surface that is coated with $aLi_2O$—$ZrO_2$ ($0.1 \leq a \leq 2$) had high initial discharge capacity and also high cyclic characteristics.

However, the test batteries of Comparative Examples 1-7 had low initial discharge capacity and low cyclic characteristics. Also, when a material for the coating film was $ZrO_2$, that is, in Comparative Example 6, cyclic characteristics of the test battery were decreased.

Examples 8-11

The test batteries of Examples 8-11 were charged with a constant current at a rate of 0.05 C at a temperature of 25° C. up to an upper voltage limit of 4.3 V and an initial discharge capacity thereof was measured, and then, the test batteries were discharged at a rate of 0.1 C until the final discharge voltage reached 2.5 V. Then, within the same current and voltage ranges, charging and discharging were repeatedly performed for 20 cycles. After 20 cycles, a capacity maintenance ratio of the test batteries with respect to initial capacity was measured to evaluate cyclic characteristics.

Separately, the test batteries manufactured according to Examples 8-11 were charged with a constant current at a rate of 1 C at a temperature of 25° C. up to an upper voltage limit of 4.3 V, and an initial discharge capacity thereof was measured. Then, the test batteries were discharged at a rate of 0.1 C until the final discharge voltage reached 2.5 V.

After 1 cycle, a discharge capacity ratio at a rate of 0.05 C with respect to the discharge capacity at a rate of 1 C was measured, and rate characteristics were evaluated.

Evaluation results of the battery characteristics are shown in Table 2.

TABLE 1

| | Positive active material | Materials for coating film | A | $aLi_2O$—$ZrO_2$ amount (mol %) | Initial discharge capacity (mAh/g) | Capacity maintenance ratio after 30 cycles (%) | Remarks |
|---|---|---|---|---|---|---|---|
| Comparative Example 1 | NCM | $aLi_2O$—$ZrO_2$ | 1 | 0 | 110 | 80 | NCM333 |
| Comparative Example 2 | | | | 0.05 | 110 | 80 | |
| Example 1 | | | | 0.1 | 128 | 90 | |
| Example 2 | | | | 0.5 | 130 | 95 | |
| Example 3 | | | | 2 | 125 | 95 | |
| Comparative Example 3 | | | | 3 | 100 | 90 | |
| Comparative Example 4 | | $Li_2SiO_3$ | — | 0.5 | 100 | 90 | |
| Comparative Example 5 | | $Li_2Ti_2O_5$ | — | 0.5 | 95 | 90 | |
| Example 4 | NCA | $aLi_2O$—$ZrO_2$ | 1 | 0.5 | 120 | 95 | |
| Example 5 | LCO | | | 0.5 | 110 | 90 | |
| Comparative Example 6 | NCM | $aLi_2O$—$ZrO_2$ | 0 | 0.5 | 115 | 85 | Coating with $ZrO_2$ |
| Example 6 | | | 0.1 | | 115 | 90 | |
| Example 7 | | | 2 | | 120 | 95 | |
| Comparative Example 7 | | | 2.5 | | 95 | 90 | |

TABLE 2

|  | Structure of positive electrode | Discharge capacitance (mAh/g) | Rate characteristics (%) (1 C rate/0.05 C rate) | Cyclic characteristics (%) (Capacitance after 20 cycles) |
|---|---|---|---|---|
| Example 8 | Small-particle diameter positive active material + aLi$_2$O—ZrO$_2$ coating film | 114 | 58 | 80 |
| Example 9 | Small-particle diameter positive active material | 101 | 36 | — |
| Example 10 | Large-particle diameter positive active material | 94 | 23 | 74 |
| Example 11 | Large-particle diameter positive active material + coating film | 110 | 23 | — |

Referring to Table 2, it was confirmed that the test battery of Example 8 had excellent discharge capacity and rate characteristics and excellent cyclic characteristics.

Figure 5A:
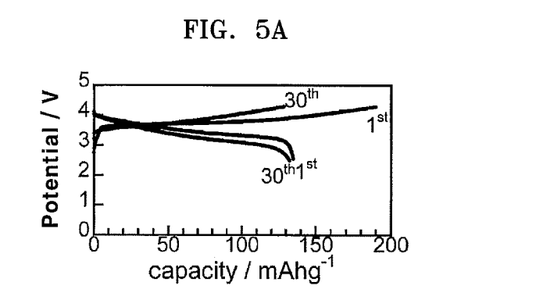
FIG. 5A is a graph of potential (Volts) versus specific capacity (milliampere-hours per gram) showing evaluation results of charging and discharging characteristics of a test battery manufactured according to Example 2.
Figure 5B:
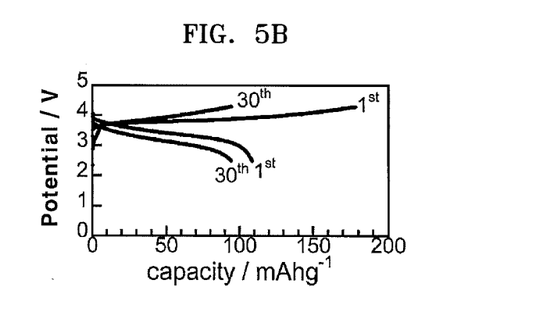
FIG. 5B is a graph potential (Volts) versus specific capacity (milliampere-hours per gram) showing evaluation results of charging and discharging characteristics of a test battery manufactured according to Comparative Example 2.
Figure 6A:
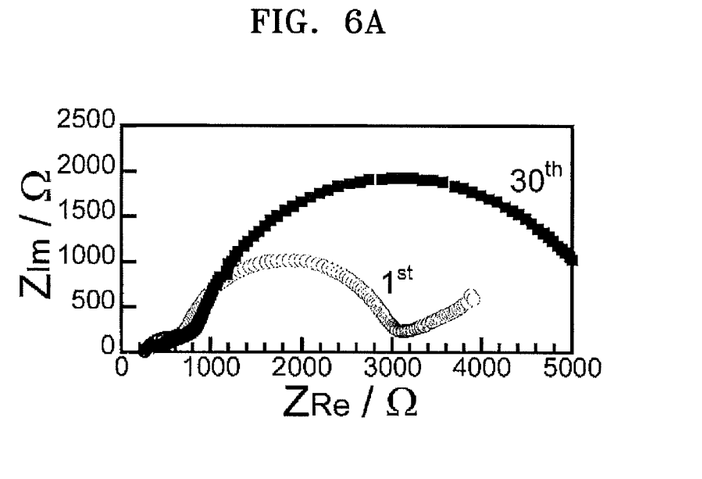
FIG. 6A is a graph of imaginary resistance ($Z_2$, ohms) versus real resistance ($Z_1$, ohms) showing impedance evaluation results of a test battery manufactured according to Example 2.
Figure 6B:
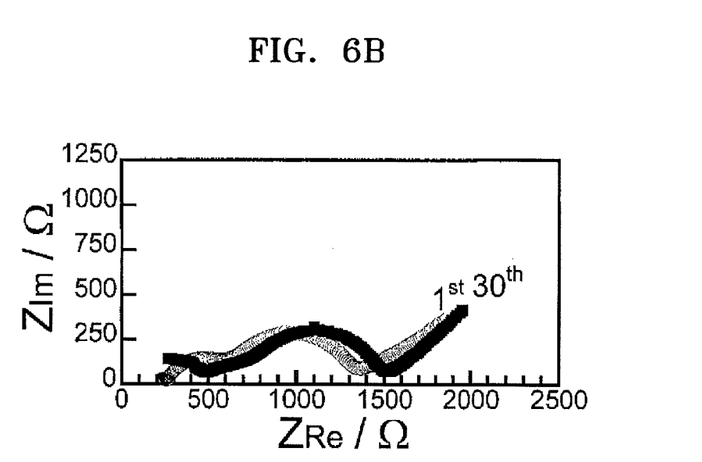
FIG. 6B is a graph of imaginary resistance ($Z_2$, ohms) versus real resistance ($Z_1$, ohms) showing impedance evaluation results of a test battery manufactured according to Comparative Example 1.

Evaluation Example 2: Charging and Discharging Characteristics and Impedance Characteristics Referring to FIGS. 5A, 5B, 6A, and 6B, charging and discharging characteristics, impedance, and rate characteristics of the test batteries manufactured according to Example 2 and Comparative Example 1 will be described herein. FIGS. 5A and 5B are graphs respectively showing evaluation results of charging and discharging characteristics of Example 2 and Comparative Example 1. FIGS. 6A and 6B are graphs showing impedance evaluation results of Example 2 and Comparative Example 1.

Regarding charging and discharging characteristics, a blocking voltage was measured according to a constant current method in which during charging, the voltage was 4.3 V, and during discharging, the voltage was 2.5 V, and charging and discharging characteristics were evaluated during initial charging and after 30 cycles. Impedance was measured according to an alternative current impedance method during initial charging and after 30 cycles.

Referring to FIGS. 5A, 5B, 6A, and 6B, when aLi$_2$O—ZrO$_2$ was coated on the surface of the positive active material, impedance of the test battery of Example 2 was suppressed, compared to the test battery of Comparative Example 1 in which a surface coating film was not formed on the positive active material, thereby leading to an improvement in charging and discharging characteristics.

Evaluation Example 3: Impedance Characteristics

The test batteries of Examples 8-11 were charged with a constant current at a rate of 0.05 C at a temperature of 25° C. up to an upper voltage limit of 4.3 V and an initial discharge capacity thereof was measured. Then, the test batteries were discharged at a rate of 0.1 C until the final discharge voltage reached 2.5 V. Then, within the same current and voltage ranges, charging and discharging were repeatedly performed for 100 cycles. Impedance after 1 cycle and 100 cycles was measured, and results thereof are shown in Table 3 below.

Impedance was measured by using an alternative current impedance method during initial charging and after 100 cycles.

TABLE 3

|  | Structure of positive electrode | Average particle diameter of positive active material (D50) (μm) | Impedance after first cycle (Ω) |
|---|---|---|---|
| Example 8 | Small-particle diameter Positive active material + aLi$_2$O—ZrO$_2$ coating film | 3.3 | 89 |
| Example 9 | Small-particle diameter Positive active material | 3.3 | 181 |
| Example 10 | Large-particle diameter Positive active material | 6.4 | 693 |
| Example 11 | Large-particle diameter Positive active material + coating film | 6.4 | 190 |

Referring to Table 3, impedance of the test battery of Example 9, in which the positive active material had a relatively small particle diameter, was relatively small compared to those of Examples 10 and 11. However, after 100 cycles, impedance of the test battery of Example 9 was greater than those of Examples 10 and 11.

However, in the case of Example 8, a aLi$_2$O—ZrO$_2$ coating film was formed on the surface of the positive active material having a relatively small particle diameter and thus, after 1 cycle and 100 cycles, impedance of the test battery was substantially decreased compared to those of Examples 9-11, and thus, lithium conductivity was improved.

In a test battery according to an embodiment, a positive active material has a widened specific surface area and reduced effects of resistance components. Accordingly, a conductivity of lithium ions may increase, during charging and discharging, and a decrease in excess voltage and an improvement in rate characteristics and cyclic characteristics may be embodied.

Hereinbefore, exemplary embodiments of an aspect have been described in detail with reference to the attached drawings. However, the aspect is not limited to the disclosed embodiments. It will be understood by those of skill in the art that various changes in form and details may be made therein without departing from the spirit and scope as defined by the following claims.

What is claimed is:
1. A lithium secondary battery comprising:
a positive electrode;
a negative electrode; and
a sulfide solid electrolyte disposed between the positive electrode and the negative electrode,
wherein the sulfide solid electrolyte comprises lithium sulfide and phosphorus pentasulfide, wherein the positive electrode comprises a positive active material particle and a coating film on a surface of the positive active material particle,
wherein the coating film comprises a composite having a structure represented by Formula 1, $a\mathrm{Li_2O}\text{—}\mathrm{ZrO_2}$ wherein $0.1 \leq a \leq 2.0$,
wherein an amount of the composite is in a range of 0.1 to 2.0 mole percent, based on a total amount of the positive active material particle and the composite,
wherein the positive active material particle has a layered rock salt structure, and
wherein the positive active material particle has
   a D10 particle diameter of about 2 micrometers to about 3.5 micrometers,
   a D50 particle diameter of about 3 micrometers to about 5 micrometers, and
   a D90 particle diameter of about 3.5 micrometers to about 5 micrometers, and
wherein the positive active material particle is
   $\mathrm{LiNi}_x\mathrm{Co}_y\mathrm{Al}_z\mathrm{O}_2$, wherein $0<x<1$, $0<y<1$, $0<z<1$, and $x+y+z=1$,
   $\mathrm{LiNi}_x\mathrm{Co}_y\mathrm{Mn}_z\mathrm{O}_2$ wherein $0<x<1$, $0<y<1$, $0<z<1$, and $x+y+z=1$, or
   a combination thereof.

2. The lithium secondary battery of claim 1, wherein the amount of the composite is in a range of 0.1 to 0.95 mole percent, based on th e total amount of the positive active material particle and the coating film.

3. The lithium secondary battery of claim 1, wherein a ratio of the lithium sulfide to the phosphorus pentasulfide is in a range of about 50:50 to about 80:20.

4. The lithium secondary battery of claim 1, wherein
   a D10 particle diameter of the positive active material particle is about 2.5 micrometers,
   a D50 particle diameter of the positive active material particle is about 3.3 micrometers, and
   a D90 particle diameter of the positive active material particle is about 4.5 micrometers.

5. The lithium secondary battery of claim 1, wherein the sulfide solid electrolyte comprises lithium sulfide and phosphorus pentasulfide, and an amount of the composite is in a range of 0.1 to 2.0 mole percent, based on the total amount of the positive active material particle and the coating film.

6. The lithium secondary battery of claim 1, wherein an initial discharge capacity of the battery is increased as compared to a same battery comprising a positive electrode comprising the positive active material particle without the coating film by 4.55% to 18.18%.

* * * * *